W. T. FIERS & L. MANOR.
TEDDER ATTACHMENT FOR MOWING MACHINES.
APPLICATION FILED MAR. 29, 1907.

898,859.

Patented Sept. 15, 1908.

2 SHEETS—SHEET 1.

Witnesses
Edwin G. McKee
Wm. Bagger

Inventors
William T. Fiers
and Luther Manor

By Victor J. Evans
Attorney

W. T. FIERS & L. MANOR.
TEDDER ATTACHMENT FOR MOWING MACHINES.
APPLICATION FILED MAR. 29, 1907.
898,859.
Patented Sept. 15, 1908.
2 SHEETS—SHEET 2.
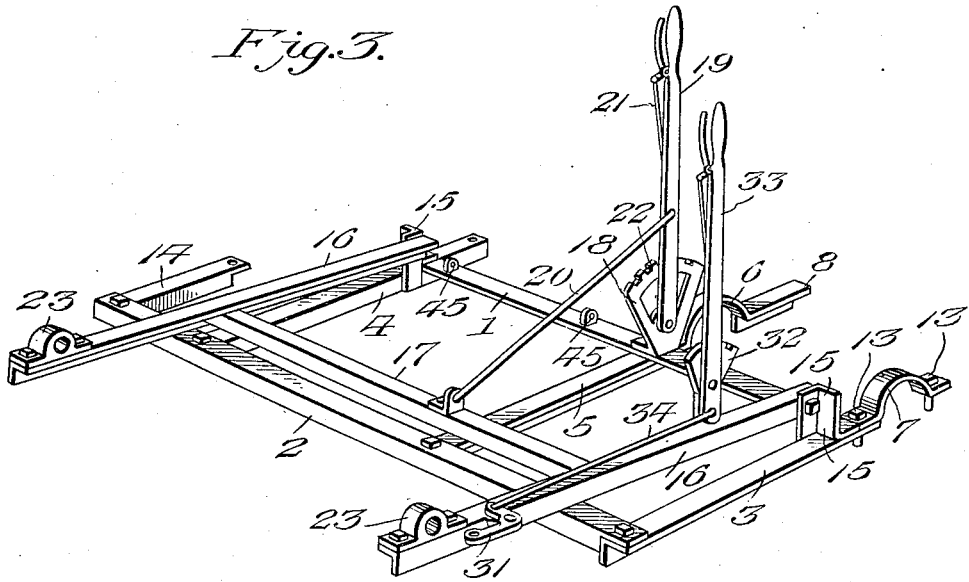
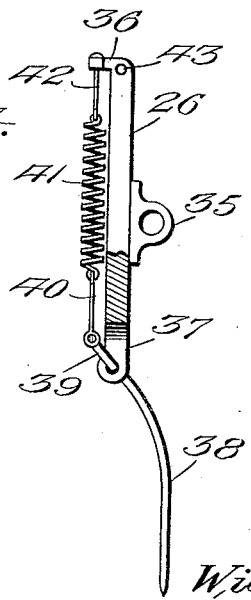
Witnesses
Edwin G. McKee
Wm. Bagger
Inventors
William T. Fiers
Luther Manor
By Victor J. Evans
Attorney
THE NORRIS PETERS CO., WASHINGTON, D. C.

UNITED STATES PATENT OFFICE.

WILLIAM T. FIERS AND LUTHER MANOR, OF REDKEY, INDIANA.

TEDDER ATTACHMENT FOR MOWING-MACHINES.

No. 898,859.  Specification of Letters Patent.  Patented Sept. 15, 1908.

Application filed March 29, 1907. Serial No. 365,367.

*To all whom it may concern:*

Be it known that we, WILLIAM T. FIERS and LUTHER MANOR, citizens of the United States, residing at Redkey, in the county of Jay and State of Indiana, have invented new and useful Improvements in Tedder Attachments for Mowing-Machines, of which the following is a specification.

This invention relates to hay tedder attachments for mowing machines; and it has for its objects to provide a device of this class which shall be simple in construction and efficient in operation, and which may be readily attached to or connected with any of the well known makes of mowing machines so as to be operated in conjunction therewith.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention; it being, however, understood that no limitation is necessarily made to the precise structural details therein exhibited, but that changes, alterations and modifications within the scope of the invention may be resorted to when desired.

Figure 1:
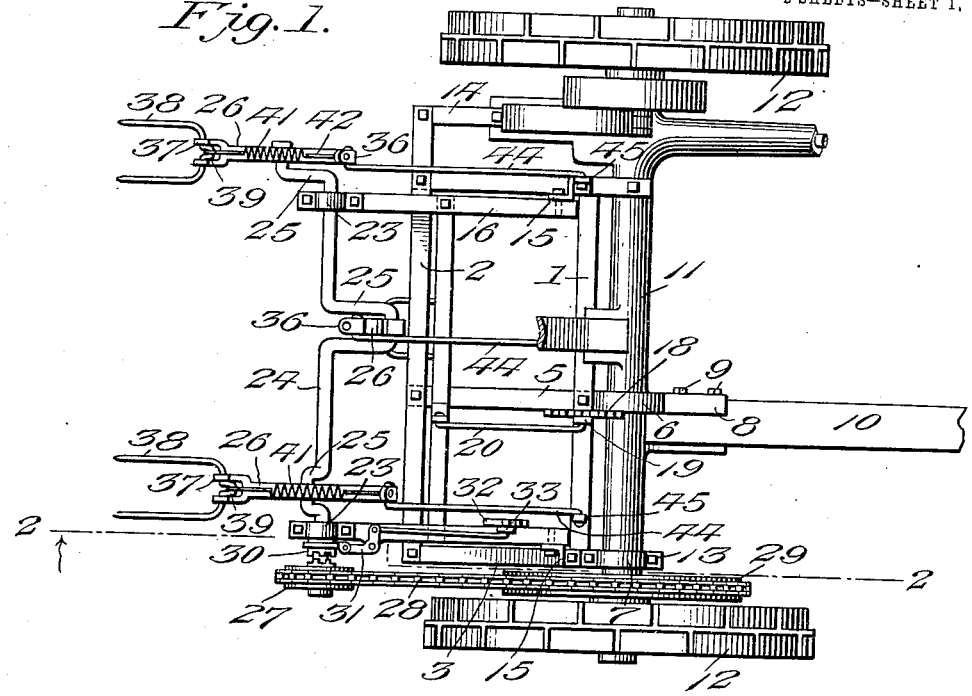
Figure 2:
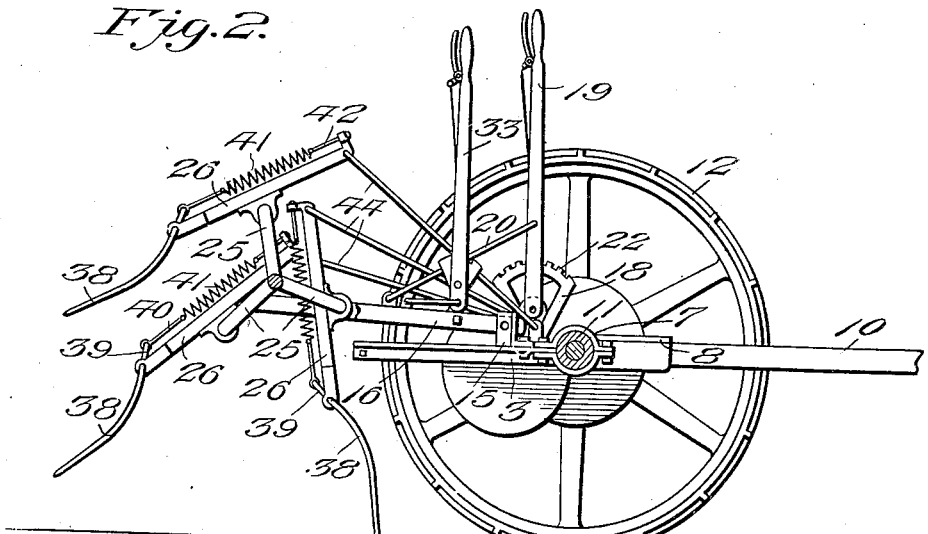

In the drawing, Figure 1 is a top plan view showing the improved tedder attachment applied to the frame of a conventional mowing machine. Fig. 2 is a sectional elevation taken on the plane indicated by the line 2—2 in Fig. 1. Fig. 3 is a perspective view showing the frame of the device which constitutes the invention, detached. Fig. 4 is a sectional elevation of one of the tedder arms.

Corresponding parts in the several figures are denoted by like characters of reference.

The main frame of the improved tedder attachment is composed of front and rear cross-bars 1—2 which are connected by the side bars 3—4 and by an intermediate brace bar 5. The latter, and one of the side bars, 3, are provided at their front ends with arch members 6—7, spanning the axle, and the forward end of the arch member 6 being provided with an angle plate 8 adapted to be secured by means of bolts or fastening members 9 upon the tongue 10 of an ordinary mowing machine, the axle of which is shown at 11 and the wheels at 12. The arch member 7 constitutes a clip member adapted to be secured upon the axle by means of bolts 13. The rear cross-bar 2 extends at one side of the frame and is provided with a forward extending brace member 14 adapted to be secured upon the frame of the mowing machine.

The side bars 3—4 are provided adjacent to the front cross-bar 1 of the frame with uprights 15 upon which are pivoted the side bars 16 of an auxiliary frame, said side bars being connected by a cross-bar 17. The front cross-bar 1 of the main frame supports a segment 18 upon which is pivoted a hand lever 19 which is connected by a link 20 with the cross-bar 17 of the auxiliary frame; the latter, which may thus be raised or lowered, may be secured at various adjustments by a suitable catch or locking device 21 connected with the hand lever and adapted to engage any one of the plurality of notches 22 in the segment 18.

The rear ends of the side bars 16 of the auxiliary, adjustable frame are provided with bearings 23 wherein a shaft 24 is supported for rotation, said shaft being provided with a plurality of cranks 25 upon which the tedder arms 26 are pivotally mounted. The shaft 24 carries a sprocket wheel 27 adapted to be connected by a chain 28 with a sprocket wheel 29 upon the axle of the mowing machine from which motion may thus be transmitted to the shaft 24. The sprocket wheel 27 is loose upon the shaft 24, but it may be operatively connected with the latter by means of a clutch member 30 slidably mounted upon the shaft and adapted to be moved into or out of engagement with the sprocket wheel 27 by means of a bell crank lever 31 pivoted upon one of the side bars 16 of the auxiliary frame; said side bar also carries a segment 32 upon which is pivoted a hand lever 33 which is connected by a link 34 with the bell crank lever 31 which may thus be operated to effect the desired adjustment of the clutch member 30.

The tedder arms 26 are provided with boxes 35 whereby they are pivoted upon the cranks 25 of the shaft 24; said tedder arms are provided at their upper ends with rearward extending brackets 36, and the lower ends of said arms are bifurcated for the reception of the tedder forks 38 which are pivoted in the bifurcations of the tedder arms and are provided with U-shaped extensions 39 which are connected by links 40 with the lower ends of coil springs 41 which are suspended by links 42 from the rearward extending brackets 36 at the upper ends of the tedder arms. The latter are provided adjacent to the brackets 36 with eyes 43 that are connected by links 44 with lugs 45 upon the front cross-bar 1 of the main frame.

The operation and advantages of this invention will be readily understood from the foregoing description taken in connection with the drawings hereto annexed by those skilled in the art to which it appertains. The auxiliary frame may be readily adjusted, by the hand lever 19, to raise or lower the shaft carrying the tedder arms; and said shaft may be thrown into and out of gear by means of the hand lever 33. By the rotation of the shaft 24, the tedder arms will be vibrated by means of the links 44 whereby their upper ends are connected with the stationary cross-bar 1 of the main frame; and the tedder forks, owing to the presence of the springs 41, will readily yield to any obstructions that may be encountered thereby, and they will also be actuated to throw the hay forcibly in a rearward direction, to agitate it thoroughly.

Having thus fully described the invention, what we claim as new is:—

In combination with a mowing machine having an axle and a tongue, a tedder attachment comprising a frame including side bars, a front bar, a rear bar and an intermediate longitudinal brace bar, said brace bar and one side bar being provided at their front ends with arch members, the arch member at the front end of the brace bar carrying an angle bar engaging the tongue of the mowing machine and the arch member at the front end of the side bar constituting a clip member, the rear bar of the frame being extended at one end and provided with a forwardly extending member, uprights upon the front bar of the frame, an auxiliary frame pivoted upon said uprights, means for adjusting the tedder frame, a crank shaft carried by the latter, tedder arms pivoted upon the crank of said shaft, means for transmitting motion to the said crank shaft from the axle of the mowing machine, and links pivotally connected to the tedder arms and to the front bar of the frame.

In testimony whereof, we affix our signatures in presence of two witnesses.

WILLIAM T. FIERS.
LUTHER MANOR.

Witnesses:
G. M. SELBY,
F. R. DOWNING.